United States Patent [19]
Frost et al.

[11] Patent Number: 4,856,760
[45] Date of Patent: Aug. 15, 1989

[54] CONTROL METHOD AND APPARATUS

[75] Inventors: Peter L. J. Frost; Robert A. Freeman, both of Ipswich; John A. Warren, Friston; Peter J. Keeble, Ipswich, all of England

[73] Assignee: British Telecommunications, London, England

[21] Appl. No.: 165,990
[22] PCT Filed: Jul. 14, 1987
[86] PCT No.: PCT/GB87/00497
§ 371 Date: Mar. 14, 1988
§ 102(e) Date: Mar. 14, 1988
[87] PCT Pub. No.: WO88/00713
PCT Pub. Date: Jan. 28, 1988

[30] Foreign Application Priority Data
Jul. 16, 1986 [GB] United Kingdom ............ 8617390
May 29, 1987 [GB] United Kingdom ............ 8712638

[51] Int. Cl.$^4$ ........................................... B65H 59/00
[52] U.S. Cl. ................................................. 254/134.4
[58] Field of Search ............ 254/134.3 R, 134.3 FT, 254/134.4, 268; 226/25, 43, 178

[56] References Cited
U.S. PATENT DOCUMENTS
4,087,748 5/1978 Pigeon et al. .................. 254/134.4
4,508,251 4/1985 Harada et al. .

FOREIGN PATENT DOCUMENTS
0108590 1/1983 European Pat. Off. .
0168278 1/1986 European Pat. Off. .

OTHER PUBLICATIONS
"A Radically New Approach to the Installation of Optical Fibre Using the Viscous Flow of Air" by Cassidy et al, Britsh Telecom Technology Journal, vol. 2, No. 1, Jan. 1984.

Primary Examiner—Robert C. Watson
Attorney, Agent, or Firm—Nixon & Vanderhye

[57] ABSTRACT

The propulsive force on an optical transmission line member moving through a tubular passageway can be varied so the line travels at or close to optimum speed without risk of damage to the line or associated apparatus. A curve is provided in a portion of the passageway such that a transmission line subject to unacceptable compressive forces buckles towards the outer side of the curve. A sensor detects the presence or absence of the line at this point and a control circuit varies the propulsive force. Excessive tension in the fibre may also be detected. A modified system uses deflectors to ensure that buckling occurs by bowing in the direction towards the sensor with the transmission line undeflected under correct tension. The invention finds particular application in a method of fibre blowing where an optical fibre transmission line is propelled along a tube by fluid drag.

44 Claims, 6 Drawing Sheets

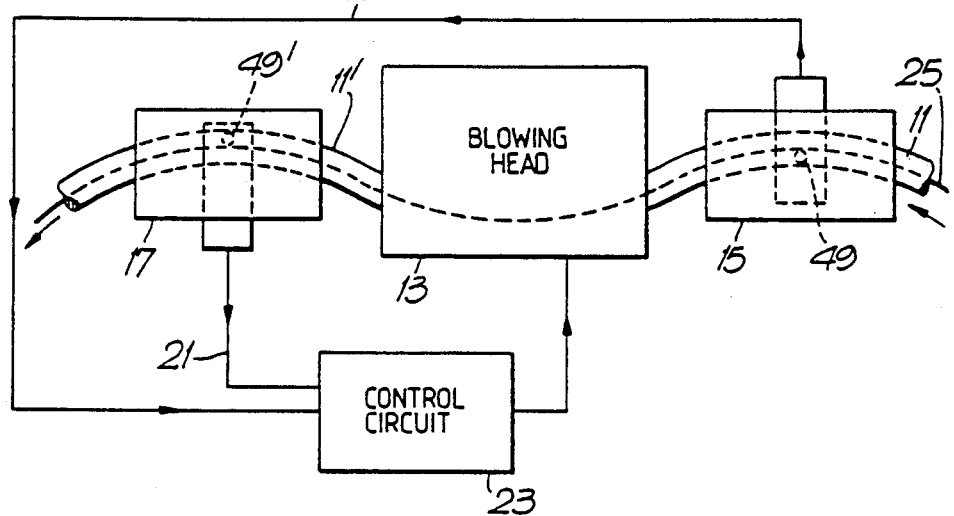
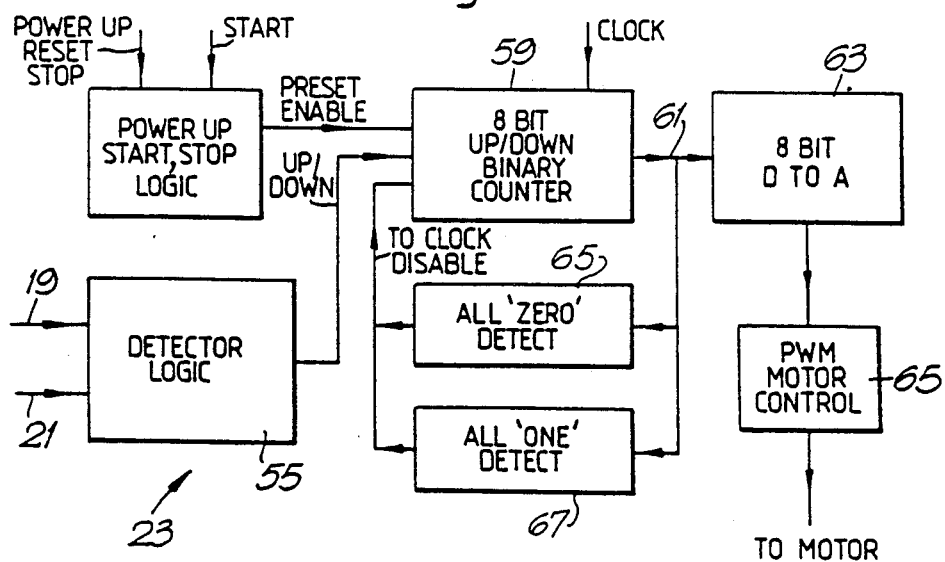

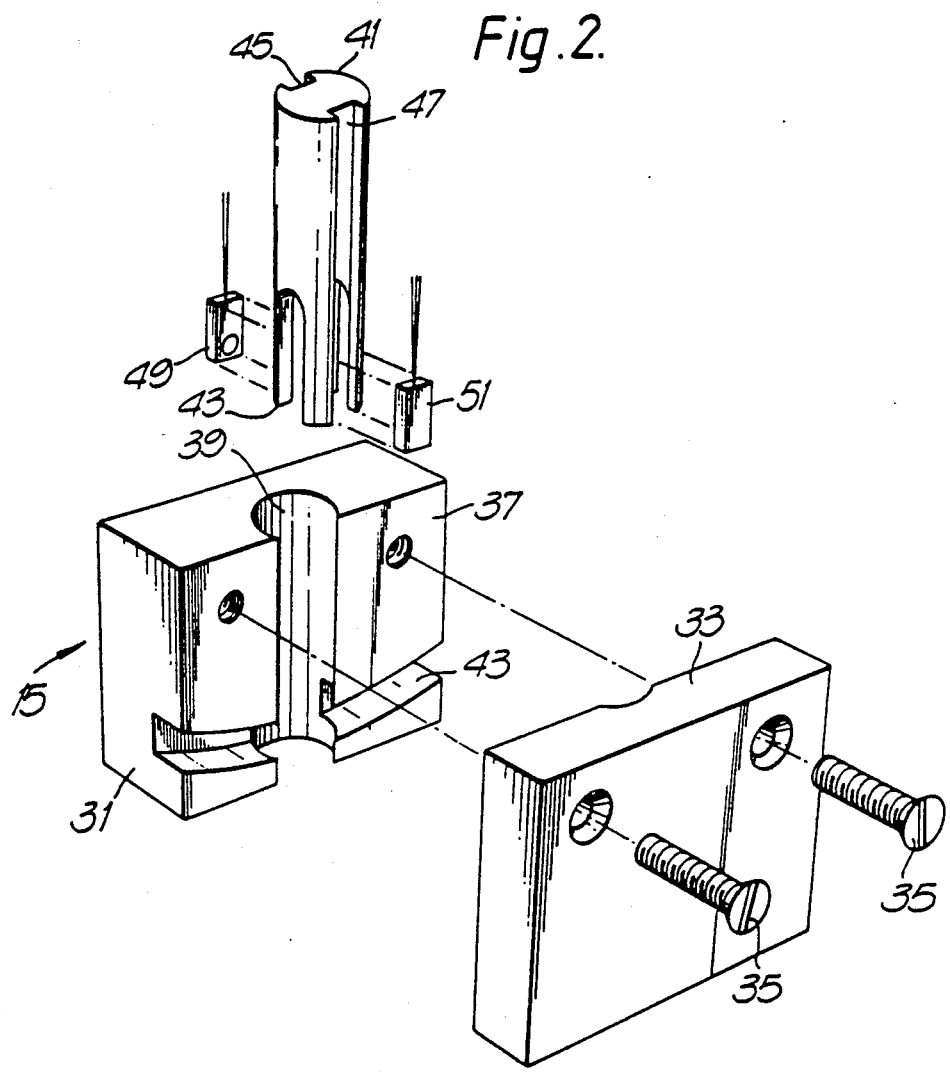

CONTROL METHOD AND APPARATUS

The present invention relates to a control method and apparatus.

Apparatus and a method for installing optical fibres in ducts, using the fluid drag of a gaseous medium such as air to propel the fibre, are described in European Patent Application No. 83306636.8.

In order to overcome the initial pressure gradient, some means such as the constant torque driving mechanism described in the above application is used.

The present applicants have now found that controlling the thrust on a member such as an optical fibre member, being inserted into a tubular pathway is advantageous, and surprisingly simple control means can be very effective in improving operation.

The control method and apparatus of the present invention are particularly (but not exclusively) suitable for use in fibre blowing. Only a brief description of fibre blowing is given here, and for a fuller treatment, the patent application mentioned above should be referred to. The invention may also be used in the installation of other members such as cables including wires and/or fibres.

Fibre blowing is a new and advantageous method for installing optical fibre transmission lines. A bundle of optical fibres is propelled along a duct by the fluid drag of compressed air which is fed into the duct. For the forces on the bundle of fibres to be adequate, the flow velocity of the air has to be much higher than the intended speed of the fibre bundle. Typically, the inner diameter of the duct is 6 mm, the outer diameter of the fibre bundle is 2 mm, its weight is 2 to 3 $gm^{-1}$ and the pressure 150 psi (approx. $10^6$Pa). Suitable material for both the duct and the fibre packaging is polyethylene, having a coefficient of friction of around 0.5.

There is a steep pressure gradient where the fibre bundle first enters a pressurised area. To assist the bundle at this point, drive wheels are incorporated in the drive unit, driven at a torque just sufficient to overcome the opposing force resisting entry of the bundle. Then pressurised air fed into the front end of the drive unit flows into the duct, its fluid drag force carrying the fibre bundle with it.

Depending on the precise dimensions, materials, pressures and so on used for fibre blowing, insertion of a fibre bundle into a considerable length of duct may be achieved. For example, with a single drive unit, fibres may easily be installed over 600 meters. For longer lengths, two or more drive units spaced, say, 600m apart, may be provided. Due to the fall in pressure along the length of a duct as distance from the previous drive unit increases, it is generally necessary to include drive wheels, or other means to provide forward thrust, in each drive unit to overcome the resistive forces due to the pressure gradient in the drive unit.

The present invention provides apparatus for controlling longitudinal forces on a flexible transmission line member moving through a passageway, the apparatus comprising a sensor for identifying lateral deviation of the transmission line member within the passageway and control means responsive to the sensor for adjusting propulsive forces on the line in response to data from the sensor.

In one embodiment, the passageway is curved. In this case undesirable compressive force on the transmission line member causes it to buckle towards a point on the outer side of the curve, and the sensor is located to detect the presence of the line at or near that point. It is very important to avoid buckling of a fibre member during fibre blowing, as this can cause expensive damage to the blowing unit. The invention can provide a very simple way of detecting when compressive forces are so high that buckling may occur, and taking preventative action to reduce the speed of the fibre member.

Within the context of this specification 'curve' is to be construed to include angled or sharp bends as well as progressive bends.

Additionally or alternatively tensile force on the transmission line member causing it to move the inner side of the passageway may be detected, and a sensor is located to detect the presence of the fibre member at or near that side. Again, potential damage can be avoided.

In an alternative embodiment the passageway itself is straight and deflectors are provided so that undesirable forces on the member cause it to move towards a sensor.

Additionally, the control means is desirably adapted to decrease the propulsion force on the transmission line member in response to data from the sensor indicating a buckle in the member and to increase the propulsion force in response to data indicating the absence of a buckle. This ensures that not only is damage to fibre or other components avoided, but the propulsion force is not allowed to drop too low, which would reduce the speed of the transmission line. In fact, in practice the speed can be kept close to the optimum for fast and effective operation.

The invention also provides a system for installing a transmission line having control apparatus as specified above.

Additionally, a method is provided for controlling the propulsive force on a flexible transmission line member moving through a passageway, comprising obtaining information on the presence or absence of the transmission line member at one or more location in the passageway, transmitting data related thereto and varying the propulsive force on the transmission line member in dependence on said data.

The invention will now be described, by way of example, with reference to the accompanying drawings in which:

FIG. 1 is a diagrammatic view of apparatus according to an embodiment of the present invention;

FIG. 2 is an exploded, perspective view, of a detector shown in FIG. 1;

FIG. 6 is a block diagram of the control circuit of FIG. 1;

Figure 3:
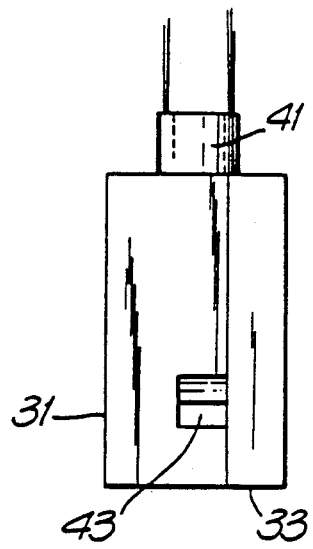
FIGS. 3 and 4 are side and front elevations, respectively, of the same detector.

Referring to FIG. 1, this shows two portions 11, 11' of duct upstream and downstream respectively of a blowing head 13. The duct passes through two detectors 15 and 17, which are connected via lines 19 and 21, respectively, to a control circuit 23 which operates to vary the speed of a motor (not shown) in the blowing head according to signals received from the two detectors 15, 17. Detector 15 is positioned to detect excessive tension and detector 17 to detect excessive compression forces acting on a transmission line member 25, which may typically comprise a bundle of optical fibres, with or without accompanying electrical conductors, encased in a low density coating, as it is propelled through ducts 11, 11'. When either or both of these forces rise too high, then the speed of the motor is reduced, and once the forces have fallen, the motor is speeded up again. Fibre blowing can occur much faster and more reliably than using the apparatus described in the above-mentioned European Patent Application.

Figure 7:
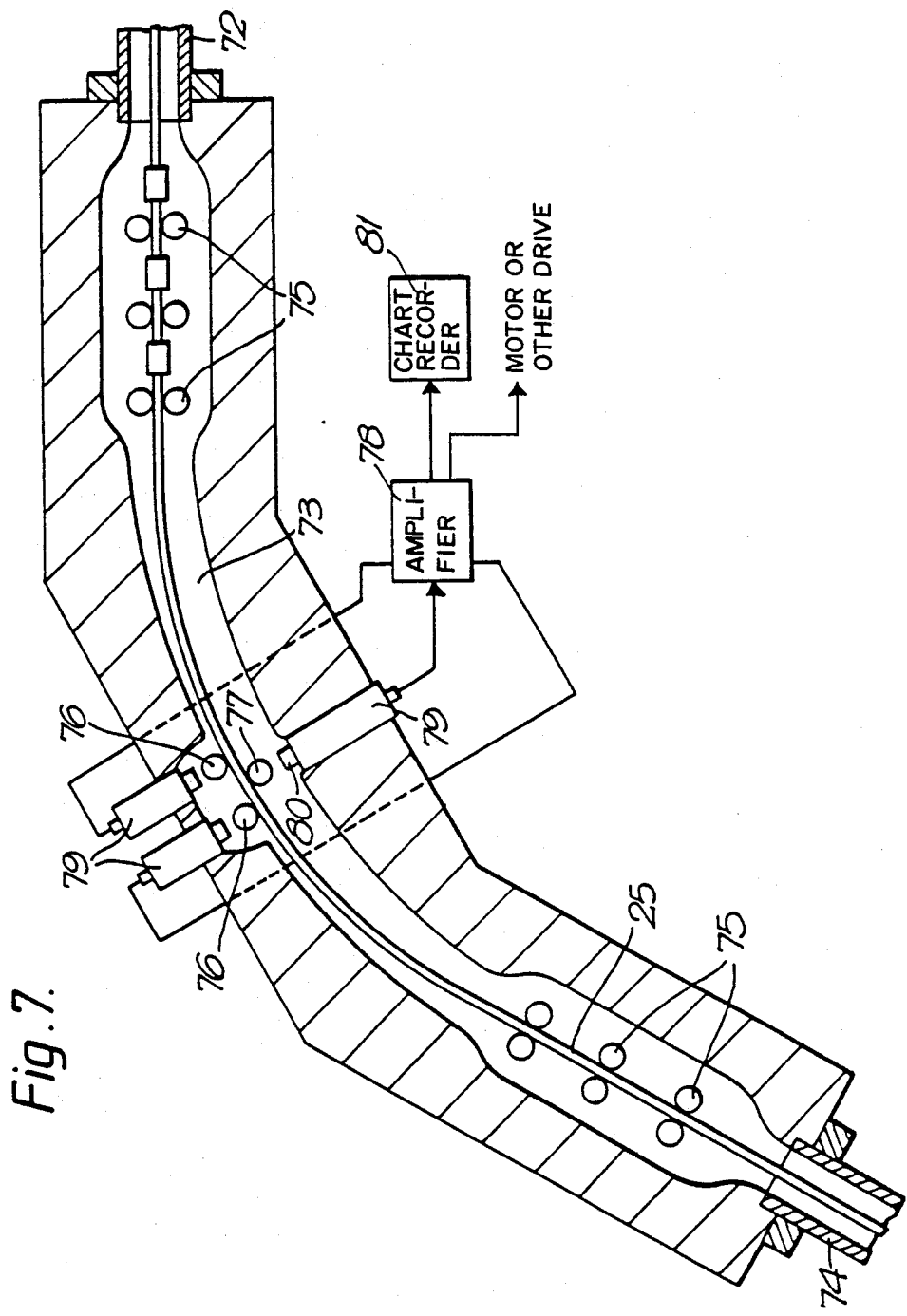
FIG. 7 is a schematic view of an alternative embodiment of the detector.

Blowing head, or drive unit, 13 is not illustrated or described in detail here as a fuller description of a similar head can be found in European Patent Application No. 83306636.8 (see FIG. 7). Unit 13 is one of a series of blowing units downstream from an initial unit (not shown) where fibre bundle 25 is first introduced. The fibre bundle is a polyethylene envelope containing several optical fibres, and weighing approximately 2 gm$^{-1}$. The duct does not extend through the unit 13 but portions 11, 11' are connected with the aid of airtight seals to the entrance and exit sides, respectively, of the unit 13. Fibre bundle 25 passes from duct 11 into unit 13 via a seal preventing backflow of air and then passes between a pair of drive wheels imparting forward thrust to the bundle. There is a downstream supply of air at 150 psi, which carries the bundle out into the second portion of duct 11'.

Figure 4:
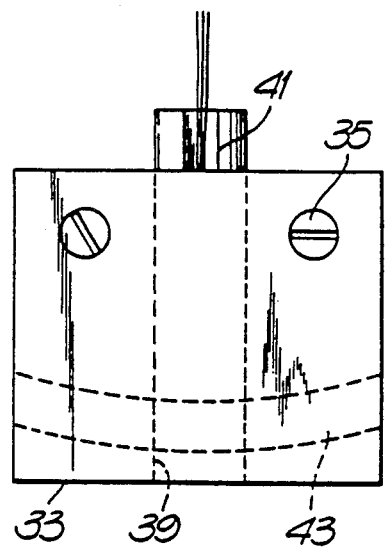

Detector 15 is positioned a short distance upstream of unit 13. One embodiment of detector 15 is shown in greater detail in FIGS. 2 to 4, and comprises a block 31, with cover 33 connected to the block by screws 35. The block has two channels, at right angles to one another, in its surface 37 which mates with the cover. Channel 39 forms, with the cover 33, a cylindrical socket to receive plug 41 (described below). This channel bisects the second channel 43, which is adapted to hold the duct 11 so that the portion in the block forms an arc of a circle, in the plane of surface 37, of radius approximately 100 mm. The length of the block is approximately 60 mm.

Plug 41 is a device carrying an optical sensor. It has a bifurcated lower end 43 (as seen in FIG. 2) to straddle duct 11, and grooves 45, 47 which locate an LED 49 and an optical receiver 51 directly in line with one another on opposite sides of the duct. Light from the LED passes to the receiver through duct 11 close to its lowermost side as seen in FIG. 1 (i.e. near the inner side of the curve). Any suitable components may be used, e.g. Radio Spares Slotted Opto Schmitt Switch 304-560, which has an LED transmitting in the infra-red at 900 nm. The material of the duct 11, 11' is polyethylene BPD 246 tube with a PZ145 additive, obtainable from Griflex Limited of Clwyd, which is transparent at 900 nm. Fibre bundle 25 is opaque to the infra-red beam.

Detector 17 is located to the downstream side of unit 13 and is of similar construction to detector 15, except the LED 49' and receiver are located close to the uppermost side of duct 11' as seen in FIG. 1, i.e. near the outer side of the arc.

Signals from the optical receivers of detectors 15 and 17 are transmitted via lines 19, 21 to detector logic 55 of control circuit 23 (see FIG. 6), which operates as described below.

The operation of the apparatus will now be described. Transmission line 25 is propelled along duct 11 by the fluid drag of air under pressure introduced at the previous blowing unit (not shown). The fluid drag produces a uniformly distributed pulling force on the fibre bundle, advancing it through detector 15 to blowing unit 13. The detector 15 acts to detect excessive tension in the fibre bundle. Too much tension is to be avoided as it can cause microbending and put the fibres in the bundle under too much strain, which may damage them.

Figure 5:
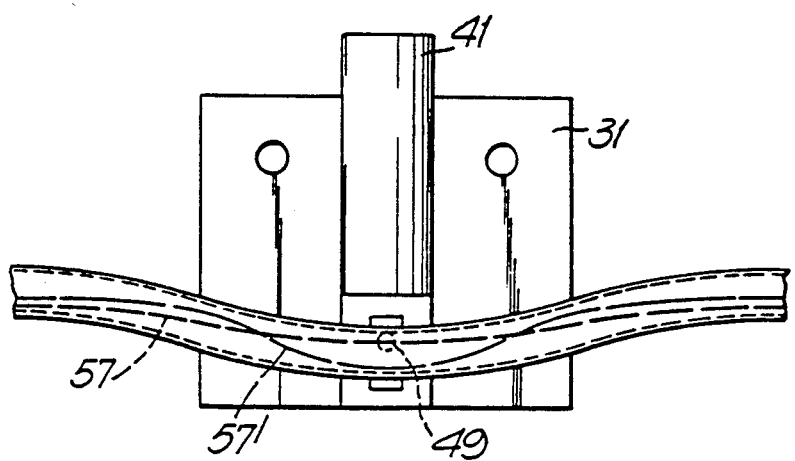
FIG. 5 is a schematic view in section of the detector with a piece of duct, showing two possible transmission line configuration.

Block 31 introduces a bend in the duct, which will generally be tighter than other bends in the duct (except in other detectors). If the forward-acting forces on the fibre bundle downstream of the detector 15 (i.e. the combined forces from the drive wheels and fluid drag) are greater than the upstream forces, then the fibre bundle will be placed under tension and the fibre will be pulled to the inner side of the curve, as indicated by the dotted line 57 in FIG. 5, and will contact the side of the duct close to the mid-point along the length of the curve. This is where the infra-red beam transmitted by LED 49 passes through the tube. The fibre bundle interrupts the beam and the speed of the motor driving the wheels is reduced (by means of circuit 23 as described below).

After emerging from unit 13 into duct 11', the fibre bundle passes through detector 17, which detects any undesired compression forces acting on the fibre. Ideally, the fibre bundle should be kept to some degree, but not excessively, under tension at all times. Compressive forces, introduced if the feed is too fast, can cause the fibre bundle to buckle. This halts the blowing process and can damage the blowing unit, and it is therefore important to avoid buckling.

The dimensions of block 31 and the radius of curvature of channel 43 are chosen so that a fibre bundle under compressive forces which are unacceptably high for safe and smooth running of the fibre blowing is caused to buckle within channel 43. The path taken by the fibre bundle is indicated by broken line 57'. Note that midway along the channel 43, the fibre bundle contacts the outer side of the curve. The optical transmitter and detector are positioned on opposite sides of this region, so that interruption of the beam indicates the presence of a buckle.

Similar considerations apply to the selection of a curve for detecting excessive tensile forces. Ideally, a diameter can be selected so that the fibre bundle moves to the inner or outer side of the curve, respectively, if the tension on the bundle is too high or the compression force too great. A 100mm radius has been found suitable for both of these purposes, for a duct of inner diameter 6 mm and a fibre bundle of 2 gm$^{-1}$ and 2 mm outer diameter.

Various different types of detectors may be utilised in place of the curved track optical sensor type detector described above. For example, the optical sensor may be replaced by a mechanical device such as a biased plunger or a trigger wire and the curved track may be replaced by an angled portion of track or by deflectors within a track (that may be straight or curved) creating a laterally deflected portion of fibre bundle that tends to deflect to a greater or lesser extent dependent upon whether it is subjected to compression or tension.

Referring now to FIG. 6, control circuit 23 is provided to vary the speed of the motor driving the wheels in unit 13 depending on the signals received from detectors 15, 17. In use, light from LEDs 49, 49' is detected by the corresponding receivers unless the beam is interrupted by the movement of the fibre bundle to the appropriate side of the duct.

The presence of a signal on lines 19, 21 is designated by a binary one and the absence of a signal is designated by a binary zero by detector logic 55. Logic 55 comprises an AND gate, so if the fibre bundle is interrupting the beam of either LED 49, 49', then a binary zero is transmitted by logic 55. Signals from detector logic 55 are clocked into a 8 bit up-down binary counter 59 which counts 'up' for a binary one and 'down' for binary zero. 8 bit words are subsequently clocked onto line 61 to 8-bit D to A converter 63. The signals on line 61 are also transmitted to detectors 65 and 67 which detect strings, respectively, of all zeros and all ones. Either of these conditions disables further clocking onto line 61 until there is a change in the up/down counter, whereupon the clock is re-enabled. On an all-ones signal, the analogue signal from D to A converter 63 operates a pulse width modulation controller 65 for the motor so that the maximum permissible pulse width for the motor is adopted. Similarly, an all zeros signal causes the pulse width to be reduced to zero. Intermediate signals, out of the 256 possibilities, result in corresponding intermediate pulse widths.

The clock rate selected is 1000 Hz, so the changes in the speed of the motor occur very rapidly. If the fibre is travelling along the centre of the duct, there will be an all one signal and the motor will be speeded up. Very quickly, at least one of the intra-red beams will be interrupted and binary zeros will be input to counter 59. This will cause the motor to slow down a little, and its rate of deceleration will increase as long as one of the beams remains interrupted. At some point, the motor speed will have reduced sufficiently for both beams to be detected, and the motor will begin to speed up again. This behaviour continues throughout the whole of the blowing process, with the fibre bundle continually moving just into and just out of the line of the infra-red beams, as the motor speed rises and falls, thus increasing and reducing the thrust on the bundle. In normal operation the voltage may remain within the range 15±5 V, with 24 V DC being the maximum rated voltage for the motor. This keeps the fibre moving as fast as possible, with just below the maximum acceptable tension and compressive forces before and after the blowing unit. Thus, as compared with the apparatus described in European Patent Application No. 83306636.8, fibre blowing can take place more rapidly, and the process is less likely to be disrupted due to buckling of the fibre bundle. The time taken to insert 600 m of 2 mm fibre bundle into a 6 mm duct using the apparatus described above is typically 22 minutes.

FIG. 7 illustrates a mechanical type of sensor located in a curved track. This particular detector is capable of sensing both tension and compression, although in fact it is necessary to sense only tension or compression. A fibre bundle 25 from a drive heat (not shown) is fed into an upstream portion 72 of duct that connects with a curved channel 73 that in turn connects to a downstream portion of duct 74. The curved channel 73 may be formed by a mechanical groove in a brass block and the radius of the curve is set to be greater than the minimum bend radius for the line and preferably at the natural set radius of the line. At the ends of the channel the bundle 25 passes through bearings 75 which are mounted to absorb spurious lateral and vertical movement of the line 25. In the central region of the channel the bundle passes through a further set of bearings 76 and 77, two bearings 76 being on the radially outer side of line 1 as it passes around the curved channel and a single bearing 77 being on the inner side of the curve. The configuration of the bearings 76 and 77 may be reversed or the number of bearings changed, but it is generally preferred to have at least three bearings for stability. Each set of the bearings 76 and 77 is connected to a sensor 79, such as a piezo-electric transducer or a strain gauge to convert any incremental movement into electrical signals which are then amplified by a charge amplifier 78 and used to control the motor (not shown) that feeds the fibre bundle into the duct which may be a motor for drive wheels within a blowing head or a motor for a motorised reel for non driven installations. Optionally (for all embodiments of detector) the signals may also be fed to a chart recorder 81 to provide a tension versus time or distance plot of the installation process, although the accuracy of compression measurement depends upon the stiffness of the bundle 25.

In the event of tension on the bundle 25, then the line tends to move towards the inner radius of the curve and presses against bearing 77 which causes a tension signal to be generated, which causes an increase in propulsive force on the bundle.

In some installations the bundle may not be fed from a motorised reel or drive wheels but may be fed in freely or be fed from the output of an earlier blown installation. In this instance a positive tension measurement can be reduced by lowering the pressure of the blowing head, and the signal from the transducer may be used to adjust the pressure.

In addition to the monitoring and adjustment enabled by the transducer output, a cut out switch may be provided to close down the blowing procedure in the event that the tension reaches too great a level. Such a switching device may be placed in the transducer circuit and be operated at a threshold signal level, but it is preferred to utilise an independent mechanical circuit breaker. For this purpose the bearing 77 is biased radially (with respect to the curve of the channel 73) towards the bundle 25. This bias may be provided by a spring. A switch 80 is mounted at the inner edge of channel 73 where it is operated by the bearing 77 in the event of the tension in bundle 25 being sufficient to overcome the bias and urge the bearing onto the switch. The bias is selected so that the bearing operates the switch when the tension reaches a predetermined maximum safe limit for the line. When operated the switch closes down the blowing operation by breaking the compressor circuit and may also be arranged to break any motorised feed circuit.

In the event that a longitudinally compressive force is exerted on the bundle within the channel 73, the bundle will move to the radially outward side of the curve and will operate against bearings 76 in an analagous way to that described for bearing 77. A signal is generated causing the motor to slow down.

Figure 8:
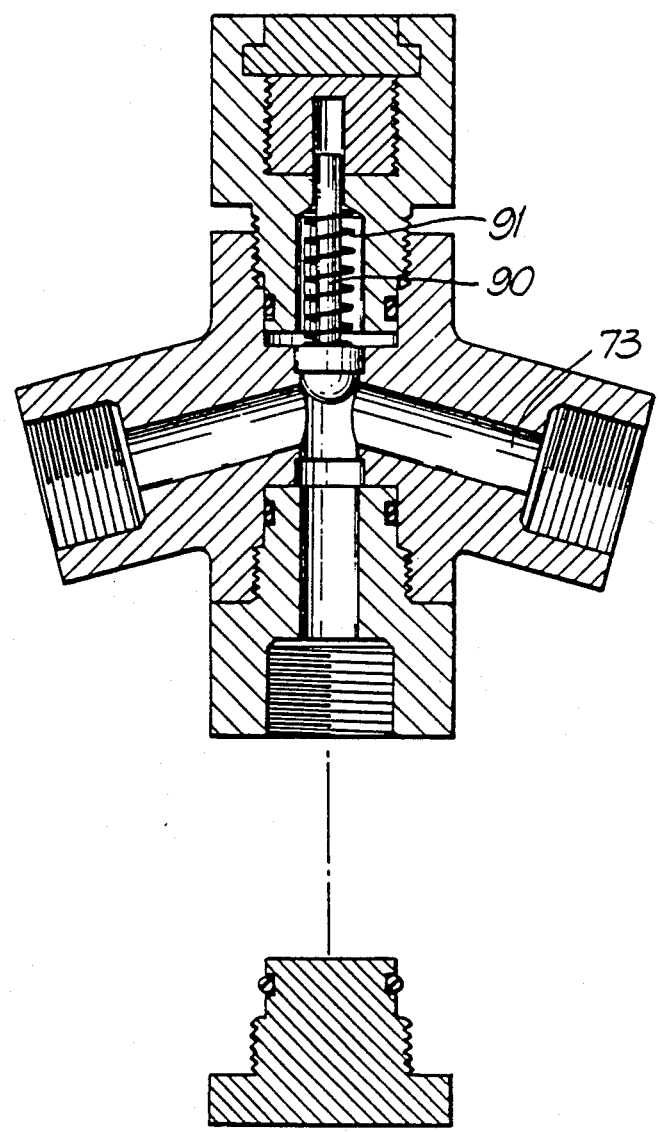
FIG. 8 is a schematic view of another embodiment of the detector.

FIG. 8 illustrates a T connection piece detector in which a mechanical sensor is located in a T-piece. Depending upon whether the leg of the T is on the inside or outside of the angular deflection of the package the detector will monitor for tension or compression. The duct connected to the T Piece may be held within a jig that enables the flexible duct to be bent through different angles and curves. Once installation is completed the T piece can be removed and the duct ends connected. The plunger device comprises a plunger 90 biased by a spring 91. When a transmission line impinges on the plunger this movement of the plunger interrupts an optical beam at its other end in response to a predetermined pressure (movement). The spring can be adjusted to vary the sensitivity of the plunger, and its projection into the duct may also be varied to adjust the interrupt threshold. The forces on the transmission line are adjusted as before to correct for excessive tension or compression.

In some instances it is convenient for the detectors to be within the blowing head housing in a combined assembly. This may be done for all the detectors described.

Figure 9:
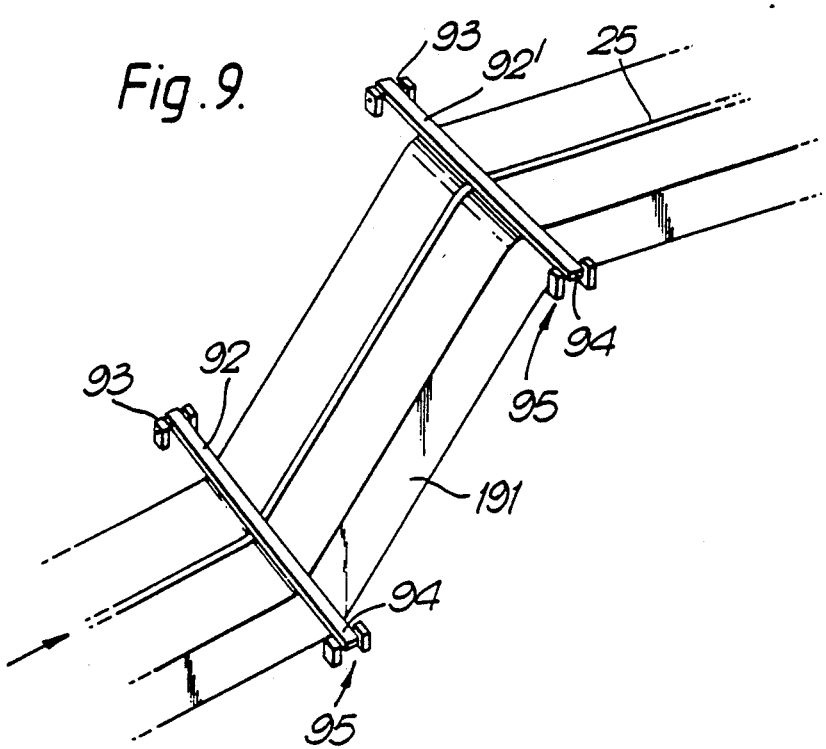
FIG. 9 is a schematic view showing a further embodiment of the detector.

FIG. 9 illustrates a trigger bar type of detector. A sloping channel 191 is formed within a blowing head. Fibre bundle 25 advances under first wire or bar 92, then upwards within the channel and under second bar 92'. Excessive tension causes the bundle 25 to touch bar 92, and excessive compression causes movement towards bar 92'. Both bars are pivoted at one end 93 and movement is sensed at the other end 94 by an optical device 95.

Figure 10:
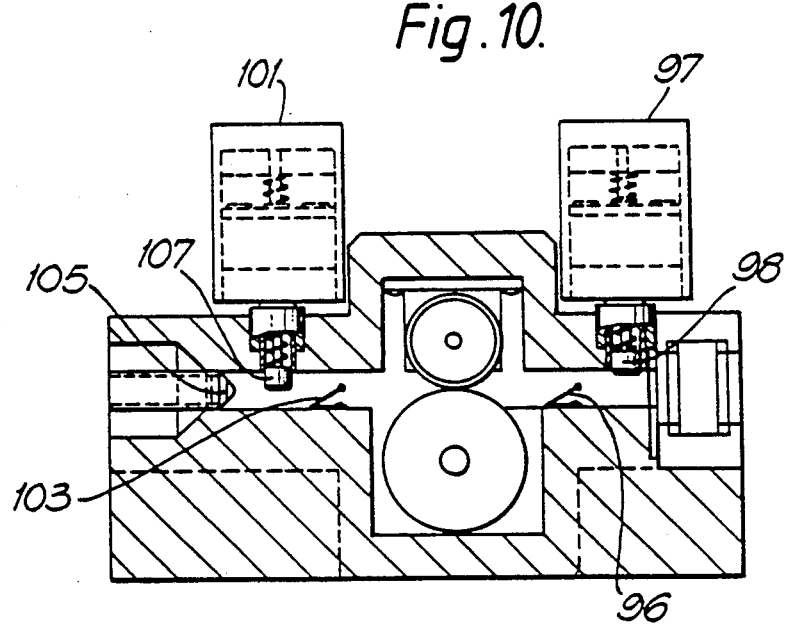
FIG. 10 is a schematic view showing a further embodiment of the detector.

FIG. 10 schematically illustrates a combined assembly that incorporates mechanical sensors and deflectors for creating lateral displacement of the fibre bundle 25. The bundle enters the head from the left of the Figure. The right hand detector 97 is a buckle detector and the plunger end 98 of the sensor is spaced away from the fibre package 25. In close proximity to the plunger (as shown, shortly before the plunger in terms of direction of travel of the fibre bundle) a deflector 96 or baffle displaces the line laterally towards the detector. In the event of buckling, the fibre bundle will tend to continue to deflect or bow in the same direction and press against the plunger sensor 98. The height of the baffle and/or the projection of the plunger into the passageway enables sensitivity adjustment. A tension detection mechanism 101 has a deflector 103 spaced a small distance downstream from the plunger, the fibre bundle following a slightly upward path (as viewed) from seal 105 to the deflector 103, with the plunger 107 just out of contact with the bundle. In the event of tension the fibre bundle is pulled taught so that it comes into contact with the plunger 107.

A modification to the arrangement shown in FIG. 10 is for the deflectors to be passive, that is not disturbing the normal route of the fibre bundle but serving to determine its route under tension or compression. Thus the deflector in the buckle detecting system may comprise an insert that merely prevents the fibre from bowing away from the sensor and thus may comprise a restriction to the duct in the proximity of the sensor. For tension monitoring the plunger may be in actual contact with the fibre bundle and function to detect the increase in pressure due to the fibre bundle pulling taught between two points.

Instead of a series of blowing units, there may be only a single one. In this case, it may be found adequate to have a single detector with an optical sensor located on the outer side of the arc of a curved duct to detect buckling of the bundle as it leaves the blowing unit, i.e. to include a detector 17, which the duct passes through a short distance downstream of the blowing unit. The detector 17 may alternatively include two sensors, one near the inner and one near the outer side of the curve, to detect both tension and compression in the fibre bundle leaving the blowing unit. High tension would be indicative of too low a thrust on the bundle; thus interruption of the beam of the LED on the inner side of the curve would be interpreted by the control circuit as requiring an increase in motor speed.

Some or all of the detectors in a blowing system may be provided with two or more sensors to detect various configurations of the fibre bundle. For example, a sensor may be placed to detect the presence of the bundle at the optimum location in the duct, which would maintain the motor speed constant as long as the bundle remained at the optimum position.

In the above example, the control circuit varies the speed of a motor which drives wheels in the blowing unit, which engage and impart thrust to the fibre bundle. The circuit and blowing head may be modified to provide some alternative means of varying the thrust on the bundle.

Suitable dimensions for the detector, and the radius of curvature which it imposes on the duct, may readily be selected by experiment. Radii in the range 75 to 300 mm will be suitable for many fibre blowing systems. Ideally, the curve is tighter than any elsewhere in the system. The curve chosen need not take the form of an arc of a circle, but will need to be tailored to cause buckling when unacceptable compressive forces arise. The precise positions of the sensors may easily be varied and one or more sensors may be provided for each detector. The effect on the pwm motor control 65 may be observed using an oscilloscope and any desirable changes to clock rate or sensor position made.

In some blowing systems its may only be necessary to sense for buckling or tension.

As well as the use described for controlling the speed of fibre blowing, the control apparatus may also be used, for example, to control the speed of reeling of fibre.

Generally it is advantageous to have a buckle detector a short distance downstream of the drive means of a blowing head (which may be wheels or some other means of applying propulsive force such as compressed air). In this case, a signal indicating an excessive compression force from the drive means results in a reduction of that force. Also, there is advantageously a tension-detector upstream of the drive means, and detection of excessive force also results in a reduction of the speed of the drive motor, or variation to reduce the force on the transmission line. In addition (or alternatively) it is possible to provide a downstream tension detector and an upstream buckle detector. Each of these is arranged to send a signal to trigger an increase in drive speed or other propulsive force on the transmission line if excess force is detected.

We claim:

1. Apparatus for controlling longitudinal forces on a flexible transmission line member moving within and through a curved passageway, the apparatus comprising:

sensing means for identifying lateral deviation of the transmission line member from a predetermined central position within said curved passageway, and control means responsive to the sensing means for adjusting propulsive forces on the transmission line member in response to data from the sensing means so as to return said member towards said predetermined central position.

2. Apparatus according to claim 1 in which the sensing means are located at the outer and/or inner curved side of the curved passageway.

3. Apparatus for controlling the propulsive force on a flexible transmission line member moving through a passageway, wherein at least a portion of the passageway is curved and the apparatus comprises:

sensing means for identifying the presence or absence of the transmission line member near the inner and/or outer side of a curve, and control means for varying the propulsive force on the transmission line in dependence on data received from the sensing means.

4. Apparatus according to claim 1 or 3 in which the sensing means comprise a displacement member that is arranged to be displaced by the transmission line member when the lateral deviation of the transmission line member exceeds a predetermined value.

5. Apparatus according to claim 1 or 3 in which the transmission line comprises one or more optical fibres.

6. A transmission line blowing system comprising one or more blowing units supplied with a gaseous medium for propelling a lightweight and flexible transmission line member along a tubular pathway, including at least one control apparatus as claimed in claim 1 or 3.

7. A transmission line blowing system as claimed in claim 6 having sensing means upstream and/or downstream of the or each blowing unit.

8. A transmission line blowing system as claimed in claim 6 having a first blowing unit and one or more subsequent units, wherein sensing means are located upstream of the or each of said subsequent units.

9. A transmission line blowing system as claimed in claim 8 wherein the sensing means upstream and downstream of a blowing unit are adapted to send data to common control means which is adapted to respond to detection of the presence of a transmission line member by either sensing means to reduce the propulsive force on the member.

10. A transmission line blowing system as claimed in claim 6 wherein the blowing unit includes a motor to impart propulsion force to the member and the control means is adapted to vary the speed of the motor.

11. Apparatus for controlling longitudinal forces on a flexible transmission line member moving through a passageway, the apparatus comprising:

means for laterally directing the transmission line member, sensing means for identifying lateral deviation of the transmission line member, and control means responsive to the sensing means for adjusting propulsive forces on the transmission line member in response to data from the sensing means, the means for laterally directing including a deflector located to direct the transmission line member towards the sensing means in the event of undesirable compressive or tensile forces on the transmission line member.

12. Apparatus according to claim 11 wherein the sensing means comprise an optical transmitter and receiver, located on opposite sides of the passageway and the passageway is transparent to a beam from the transmitter and the transmission line is opaque thereto.

13. Apparatus according to claim 11 in which the sensing means comprise a displacement member that is arranged to be displaced by the transmission line when the lateral deviation of the transmission line exceeds a predetermined value.

14. Apparatus according to claim 11 wherein the sensing means are located to detect the presence or absence of the transmission line member at a plurality of locations.

15. Apparatus according to claim 11 in which the transmission line comprises one or more optical fibres.

16. A transmission line blowing system comprising one or more blowing units supplied with a gaseous medium for propelling a lightweight and flexible transmission line member along a tubular pathway, including at least one control apparatus as in claim 11, 12, 13, 14, or 15.

17. A transmission line blowing system as in claim 16 having sensing means upstream and/or downstream of the or each blowing unit.

18. A transmission line blowing system as in claim 16 having a first blowing unit and one or more subsequent units, wherein sensing means are located upstream of the or each of said subsequent units.

19. A transmission line blowing system as in claim 16 wherein the sensing means are located upstream and downstream of a blowing unit and are adapted to send data to common control means which is adapted to respond to detection of the presence of a transmission line member by either sensing means to reduce the propulsive force on the member.

20. A transmission line blowing system as in claim 16 wherein the blowing unit includes a motor to impart propulsion force to the member and the control means is adapted to vary the speed of the motor.

21. Apparatus for controlling the propulsive force on flexible a transmission line member moving through a passageway, the apparatus comprising:

means defining a curved path for the transmission line member so that undesirable compressive or tensile forces on the transmission line member cause it to move towards a point, respectively, on the outside or inside of the curved path, sensing means for identifying the presence or absence of the transmission line member near the inside or outside of the curved path, and control means for varying the propulsive force on the transmission line in dependence on data received from the sensing means.

22. Apparatus according to claim 21 in which the means for defining a curved path comprises side walls defining a curved portion of passageway.

23. Apparatus according to claim 21 in which the means for defining a curved path comprises deflectors.

24. Apparatus according to claim 21 wherein the sensing means comprise an optical transmitter and receiver, located on opposite sides of the passageway and the passageway is transparent to a beam from the transmitter and the transmission line is opaque thereto.

25. Apparatus according to claim 21 in which the sensing means comprise a displacement member that is arranged to be displaced by the transmission line when the lateral deviation of the transmission line exceeds a predetermined value.

26. Apparatus according to claim 21 wherein the sensing means are located to detect the presence or absence of the transmission line member at a plurality of locations.

27. Apparatus according to claim 21 in which the curved path defines an arc of a circle of radius between 75 and 300 mm, and the sensing means are disposed at or near the midpoint along the length of the or each curve.

28. Apparatus according to claim 21 in which the transmission line member comprises one or more optical fibres.

29. A transmission line blowing system comprising one or more blowing units supplied with a gaseous medium for propelling a lightweight and flexible transmission line member along a tubular pathway, including at least one control apparatus as in claim 21, 22, 23, 23, 25, 26, 27 or 28.

30. A transmission line blowing system as in claim 29 having sensing means upstream and/or downstream of the or each blowing unit.

31. A transmission line blowing system as in claim 29 having a first blowing unit and one or more subsequent units, wherein sensing means are located upstream of the or each of said subsequent units.

32. A transmission line blowing system as in claim 29 wherein the sensing means are located upstream and downstream of a blowing unit and are adapted to send data to common control means which is adapted to respond to detection of the presence of a transmission line member by either sensing means to reduce the propulsive force on the member.

33. A transmission line blowing system as in claim 29 wherein the blowing unit includes a motor to impart propulsion force to the member and the control means is adapted to vary the speed of the motor.

34. Apparatus for controlling the propulsive force on a flexible transmission line member moving through a passageway, wherein at least a portion of the passageway is curved and the apparatus comprises:
sensing means for identifying the presence or absence of the transmission line near the inner and/or outer side of a curve, and
control means for varying the propulsive force on the transmission line in dependence on data received from the sensing means,
wherein the passageway is curved so that undesirable compressive force on the transmission line member causes it to buckle towards a point on the outer side of the curve, and the sensing means is located to detect the presence of the transmission line member at or near that side.

35. Apparatus for controlling longitudinal forces on a flexible transmission line member moving through a passageway, the apparatus comprising:
sensing means for identifying lateral deviation of the transmission line member; and
control means responsive to the sensing means for adjusting propulsive forces on the transmission line member in response to data from the sensing means;
wherein the sensing means includes an optical transmitter and receiver, located on opposite sides of the passageway and the passageway is transparent to a beam from the transmitter and the transmission line is opaque thereto.

36. Apparatus for controlling longitudinal forces on a flexible transmission line member moving through a passageway, the apparatus comprising:
sensing means for identifying lateral deviation of the transmission line member; and
control means responsive to the sensing means for adjusting propulsive forces on the transmission line member in response to data from the sensing means;
wherein the sensing means are located to detect the presence or absence of the transmission line member at a plurality of locations.

37. Apparatus for controlling longitudinal forces on a flexible transmission line member moving through a passageway, the apparatus comprising:
sensing means for identifying lateral deviation of the transmission line member; and
control means responsive to the sensing means for adjusting propulsive forces on the transmission line member in response to data from the sensing means;
where the passageway is curved where the or each curve is the arc of a circle of radius between 75 and 300 mm, and the sensing means are disposed at or near the midpoint along the length of the or each curve.

38. A method of controlling the propulsive force on a flexible transmission line member moving through a passageway, comprising:
passing the transmission line member through a curved portion of the passageway where the member is caused to deviate from an optimum central path if acted upon by undesirable forces,
sensing the presence or absence of the transmission line member at one or more locations in said curved portion, reached if undesirable tensile or compressive force acts on the transmission line member,
transmitting data related thereto, and
varying the propulsive force on the transmission line member in dependence on said data.

39. A method of advancing a lightweight and flexible transmission line member along a passageway comprising imparting propulsive force to the transmission line member and subsequently propelling the member by means of fluid drag of a gaseous medium passed through the passageway, and controlling the propulsive force on the member according to the method of claim 38.

40. A method of controlling the propulsive force on a flexible transmission line moving through a passageway comprising:
passively guiding the transmission line to form a curved portion such that variations in tension cause the transmission line to adopt different curvature at said curved portion,
sensing lateral deviation of the transmission line from a preselected curve by sensing means located to detect changes in curvature, and
controlling the propulsive force on the transmission line in response to detection of changes in curvature.

41. A method according to claim 40 in which the transmission line is guided to form a curve by deflectors.

42. A method according to claim 40 in which the transmission line is guided to form a curve by being passed along a curved passageway.

43. A method according to claim 40 in which the sensors are arranged to detect changes in curvature exceeding a predetermined limit.

44. A method according to claim 40 in which the transmission line is sensed by the sensing means only for curvature changes more than a predetermined limit.

* * * * *